(12) United States Patent
Diebolt

(10) Patent No.: US 6,481,466 B1
(45) Date of Patent: Nov. 19, 2002

(54) HOSE ASSEMBLY USEFUL IN THE TRANSPORT OF HOT FLUIDS

(76) Inventor: Mark C. Diebolt, 10 Binney Rd., Old Lyme, CT (US) 06371

( * ) Notice: Subject to any disclaimer, the term of this patent is extended or adjusted under 35 U.S.C. 154(b) by 0 days.

(21) Appl. No.: 09/295,185

(22) Filed: Apr. 20, 1999

(51) Int. Cl.⁷ .................................. F16L 11/10
(52) U.S. Cl. .............. 138/127; 138/109; 138/138; 138/140
(58) Field of Search .................. 138/109, 125, 138/126, 127, 138, 140, 177

(56) References Cited

U.S. PATENT DOCUMENTS

| | | | | |
|---|---|---|---|---|
| 2,531,700 A | * | 11/1950 | Porter | 138/126 |
| 2,577,049 A | * | 12/1951 | Uline | 138/127 |
| 2,829,671 A | * | 4/1958 | Ernst et al. | 138/138 |
| 3,042,737 A | * | 7/1962 | Brumbach et al. | 138/125 |
| 3,828,112 A | * | 8/1974 | Johansen et al. | 138/177 |
| 4,367,889 A | * | 1/1983 | Redl | 138/127 |
| 4,394,705 A | * | 7/1983 | Blachman | 138/125 |
| 5,143,122 A | * | 9/1992 | Adkins | 138/109 |
| 5,413,147 A | * | 5/1995 | Moreiras et al. | 138/125 |
| 5,613,523 A | * | 3/1997 | Klawuhn et al. | 138/126 |
| 5,622,210 A | * | 4/1997 | Crisman et al. | 138/140 |
| 5,782,270 A | * | 7/1998 | Goett et al. | 138/109 |

* cited by examiner

Primary Examiner—James Hook
(74) Attorney, Agent, or Firm—McCormick, Paulding & Huber LLP

(57) ABSTRACT

In a hose assembly useful in the transport of hot fluids, a hose body is provided and includes a generally cylindrical flexible core defining a smooth bore through which the hot fluid will flow. A braided wire sleeve is coaxial with and engages a peripheral surface of the core, and is encapsulated by an outer insulating jacket. Fittings are attached at each end of the hose assembly to facilitate connection thereof to equipment, to or from which the hot fluid is to be transported.

5 Claims, 1 Drawing Sheet

HOSE ASSEMBLY USEFUL IN THE TRANSPORT OF HOT FLUIDS

FIELD OF THE INVENTION

The present invention relates generally to equipment that utilizes hot fluid, such as deep fat fryers which employ hot oil to fry food, and is more specifically directed to conduits useful in the transport of the hot oil from one place to another.

BACKGROUND OF THE INVENTION

The present invention has general utility in the transport of hot fluids through exposed conduits, and is particularly useful for the transport of hot oil in equipment used to fry food. Accordingly, the present invention will be described as being directed to such use, but should not be construed as being limited only to this use.

In restaurants, or facilities where food is prepared in large quantities, frying is generally accomplished using a machine that employs a reservoir filled with hot oil or hot lard into which the food to be fried is immersed. Such a machine is generally referred to as a "deep fat fryer". The oil in these fryers is typically kept at an operating temperature of about 232° C. and is used in the fryer for a period of time before it must be changed. In order to insure that the hot oil remains free of contaminants from prior use, the oil is typically filtered.

In order to filter the hot oil, the oil must be transferred from the reservoir to the filter and then back to the reservoir. This is usually accomplished via hoses connecting the reservoir to the filter. Since the oil being transported is extremely hot, the hoses employed to transport the oil also become quite hot. Often these hoses are exposed to personnel, creating a hazardous environment for anyone working in close proximity to the fryer.

Another problem typically encountered with known hoses is the fact that their useful life is limited. Due to the rigorous nature of the environment in which these hoses are used, e.g., high temperature oil under pressure falling therethrough, the life of these hoses is somewhat limited.

Based on the foregoing, it is the general object of the present invention to provide a hose assembly that overcomes the problems and drawbacks of prior art hose assemblies.

It is a more specific object of the present invention to provide a hose assembly for sanitary use with hot cooking oil wherein the risk of an operator being burned is reduced.

SUMMARY OF THE INVENTION

The present invention is directed to a hose assembly for use in the transport of hot fluid, and includes a hose body having opposed ends. The hose body includes a generally cylindrical flexible core defining a smooth bore and a Generally cylindrical peripheral surface. During operation, hot fluid, such as, hot cooking oil, flows unobstructed through the bore in the flexible core. The hose body further includes a braided wire sleeve coaxial with, and engaging the peripheral surface of the core.

A flexible outer jacket is also provided and is coaxial with and encapsulates the braided wire sleeve. Means for coupling the hose body to equipment such as deep fat fryers, are also provided, thereby facilitating the transport of the hot oil, for example, from the fryer, to a filter, or vice versa.

Preferably, the flexible core is made from a food-grade fluoropolymer such as polytetrafluoroethylene (PTFE) and can withstand temperatures of approximately 232° C. In addition, it is also preferable that the braided wire sleeve be fabricated from stainless steel to enhance the structural integrity and corrosion resistance of the hose body as well as to comply with regulations concerning acceptable materials for use in the commercial preparation of food.

In the preferred embodiment of the present invention, the outer jacket is made from food-grade silicone, extruded over and encapsulating the braided wire sleeve. The silicone outer jacket operates as an insulating barrier between the braided wire sleeve and anyone coming into contact with the hose, such that a person grabbing the hose body while hot fluid is flowing therethrough, will not be burned.

The means for coupling the hose body to equipment such as deep fat fryers can take the form of a pair of collars, each adapted to receive and retain one of the ends of the hose body. Preferably each collar defines an abutment surface in communication with one of the ends of the hose body. Each collar also defines a bore substantially aligned with the bore in the flexible core of the hose body. A fitting is rotatably coupled to each of the collars and is threadably engageable with equipment, such as deep fat fryers, to which the hose assembly will be attached. In the preferred embodiment, the fittings are made from a suitable material such as steel, and are coated with electroless nickel. Fabricating the fittings in this manner is less costly than using stainless steel fittings, while still being acceptable for use in the commercial preparation of food. While a threaded fitting has been shown and described, the present invention is not limited in this regard as other means such as, but not limited to, flanges, or quick-connect fittings can be substituted without departing from the broader aspects of the invention.

DETAILED DESCRIPTION OF THE PREFERRED EMBODIMENT

Figure 1:
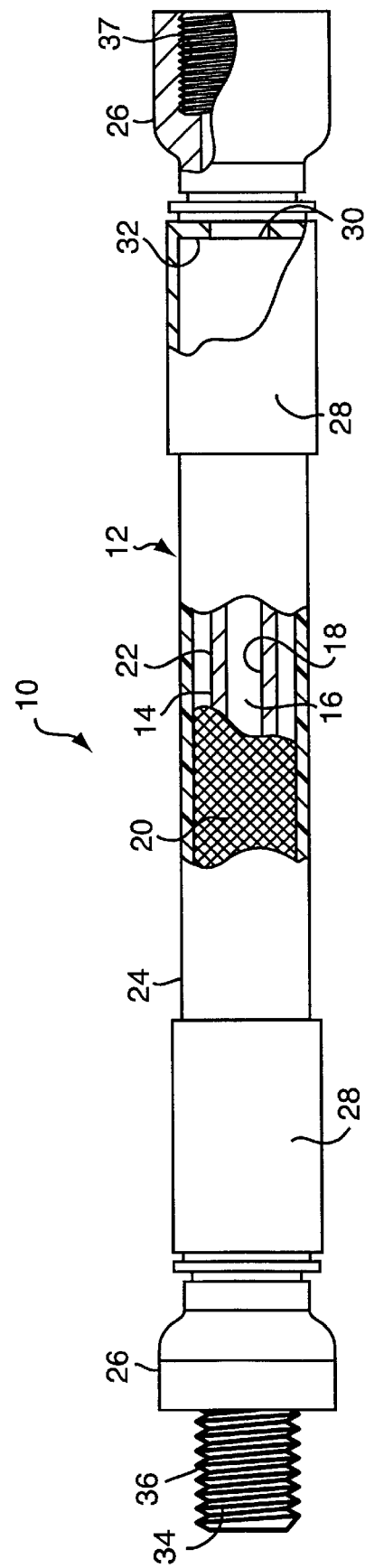
FIG. 1 is a partly cross sectional front elevational view of the hose assembly of the present invention.

As shown in FIG. 1, an embodiment of a hose assembly in accordance with the present invention is generally designated by the reference number 10, and includes a hose body generally designated by the reference numeral 12. The hose body 12 has a flexible core 14 having a bore 16 extending longitudinally therethrough and defining a substantially smooth bore wall 18. Preferably, the flexible core 14 is made from a food-grade fluoropolymer such as polytetrafluoroethylene (PTFE) and can withstand fluids passing through the bore 16 at a temperature of up to approximately 232° C. (450° F.).

A braided wire sleeve 20 is positioned over and coaxial with the flexible core 14, engaging an outer cylindrical peripheral surface 22 defined by the flexible core 14. It is preferable that the braided wire sleeve 20 be fabricated from a suitable material, acceptable for use in the commercial preparation of food such as, but not limited to, stainless steel. The braided wire sleeve adds strength and corrosion resistance to the hose body 12.

The hose body 12 also includes an outer jacket 24 extruded over the braided wire sleeve 20. The outer jacket 24 acts as an insulator, such that an operator can grasp the outer jacket 24 while fluid having a temperature of up to approximately 232° C. is flowing through the bore 16 of the flexible core 14, without getting burned. Preferably, the outer jacket 24 is fabricated from a suitable material, such as, but not limited to food grade virgin white silicone, shown in the illustrated embodiment as having a smooth finish on the jacket's outer periphery. As a result of the extrusion of the outer jacket 24 onto the braided wire sleeve 20 the jacket grippingly engages and encapsulates the braided wire sleeve, thereby minimizing the outer diameter and minimum bend radius of the hose assembly 10.

In the illustrated embodiment, a fitting 26, is rotatably attached to each end of the hose body 12 via collars 28 that grippingly engage the hose body 12. Each collar 28 defines an abutment surface 32 (one shown) that is in communication with an end 30 of the hose body 12. The collars 28 are made from a suitable material such as, but not limited to, stainless steel, or steel coated with electroless nickel. As shown, one of the fittings 26 includes an outer peripheral surface 34 that defines external threads 36 adapted to threadably engage a piece of equipment (not shown) to which the hose assembly is to be attached. The other of the fittings 26 is shown as having internal threads 37, also adapted to threadably engage a piece of equipment to which the hose assembly 10 is to be attached. Preferably, the fittings 26 are fabricated from a suitable material, such as, but not limited to, steel. The steel fittings 26 are coated with a suitable material such as, but not limited to, electroless nickel, to allow them to be used in the commercial preparation of food. While fittings having outside and inside threaded surfaces have been shown and described, the present invention is not limited in this regard as other types of fittings known to those skilled in the pertinent art to which the invention pertains, such as, but not limited to, flanged fittings, and quick-release couplings may be substituted without departing from the broader aspects of the present invention. Furthermore, while the collars have been described as grippingly engaging the hose body, the present invention is not limited in this regard as other types of fittings known to those skilled in the pertinent art to which the invention pertains, such as, but not limited to bonding via an adhesive may be substituted without departing from the broader aspects of the present invention.

During operation, the hose assembly 10 is coupled via the fittings 26 to the equipment from which the hot fluid, usually hot cooking oil, is to be transported or delivered. For example, in connection with deep fat fryers, the hose assembly 12 is often attached at one end to a filter for removing contaminants from the hot cooking oil, and at the other end to the hot cooking oil reservoir. In this fashion, the hot oil can be delivered from the filter to the reservoir, or vice versa. As the hot cooking oil flows through the hose assembly 10, the outer periphery of the jacket 24 remains at a temperature below that which would burn the skin of a person coming into contact with the jacket's outer periphery.

While preferred embodiments have been shown and described, various modifications and substitutions may be made without departing from the spirit and scope of the invention. Accordingly, it is to be understood that the present invention has been described by way of example, and not by limitation.

What is claimed is:

1. A hose assembly for use in the transport of hot fluid, comprising:
   a hose body having opposed ends, said hose body consisting of:
     a generally cylindrical flexible core defining a smooth bore and a generally cylindrical peripheral surface,
     a braided wire sleeve coaxial with, and engaging said peripheral surface of said core;
     a flexible outer jacket coaxial with and engaging said braided wire sleeve, wherein said outer jacket is shrink fitted onto said braided wire sleeve; and
     means for coupling each of said opposed ends of said hose body to equipment to facilitate the transport of hot fluid to or from said equipment.

2. A hose assembly for use in the transport of hot fluid, comprising:
   a hose body having opposed ends, said hose body consisting of:
     a generally cylindrical flexible core defining a smooth bore and a generally cylindrical peripheral surface;
     a braided wire sleeve coaxial with, and engaging said peripheral surface of said core;
     a flexible outer jacket coaxial with and engaging said braided wire sleeve, wherein said flexible outer jacket is silicone; and
     means for coupling each of said opposed ends of said hose body to equipment to facilitate the transport of hot fluid to or from said equipment.

3. A hose assembly for use in the transport of hot fluid as defined by claim 2, wherein said silicone is food grade.

4. A hose assembly for use in the transport of hot cooking oil, comprising:
   a hose body having opposed ends, consisting of:
     a generally cylindrical flexible fluoropolymeric core defining a smooth bore and a generally cylindrical peripheral surface;
     a stainless steel braided wire sleeve coaxial with and engaging said peripheral surface of said core;
     a flexible food grade silicone outer jacket coaxial with and encapsulating said stainless steel braided wire sleeve;
   a pair of collars, each adapted to receive and retain one of said ends of said hose bodies in a pair of electroless nickel coated fittings, each rotatably coupled to one of said collars, said fittings being threadably engageable with one or more pieces of commercial food preparation equipment, such that said hose assembly defines a conduit for transporting said hot cooking oil to or from said food preparation equipment.

5. A hose assembly for use in the transport of hot cooking oil as defined by claim 1, wherein
   said hose body is exposed to personnel in close proximity to said food preparation equipment, and said outer jacket attains a maximum temperature below that which would burn the skin of said personnel while said hot cooking oil flows through said hose assembly at a temperature up to approximately 232° C.

\* \* \* \* \*